(12) United States Patent
Leopardi et al.

(10) Patent No.: US 9,578,026 B1
(45) Date of Patent: Feb. 21, 2017

(54) METHOD AND SYSTEM FOR DEVICE DEPENDENT ENCRYPTION AND/OR DECRYPTION OF MUSIC CONTENT

(71) Applicant: Onulas, LLC, Fort Lauderdale, FL (US)

(72) Inventors: Emmett Jay Leopardi, Wilton Manors, FL (US); Walter Riley Thurmond, III, Maple Valley, WA (US); Carl R. Harte, Tamarac, FL (US)

(73) Assignee: ONULAS, LLC, Fort Lauderdale, FL (US)

( * ) Notice: Subject to any disclaimer, the term of this patent is extended or adjusted under 35 U.S.C. 154(b) by 0 days.

(21) Appl. No.: 14/849,002

(22) Filed: Sep. 9, 2015

(51) Int. Cl.
*H04L 29/06* (2006.01)
(52) U.S. Cl.
CPC ....... *H04L 63/0876* (2013.01); *H04L 63/0428* (2013.01); *H04L 63/061* (2013.01)
(58) Field of Classification Search
None
See application file for complete search history.

(56) References Cited

U.S. PATENT DOCUMENTS

| | | | | |
|---|---|---|---|---|
| 8,619,982 B2 * | 12/2013 | Sitrick | ..................... | G06F 21/10 380/200 |
| 9,064,010 B2 * | 6/2015 | Maharajh | ............. | G06F 17/3082 |
| 2004/0158707 A1 * | 8/2004 | Kim | .................... | H04L 63/0435 713/153 |
| 2005/0021539 A1 * | 1/2005 | Short | .................... | H04L 9/001 |
| 2006/0008256 A1 * | 1/2006 | Khedouri | .......... | G06F 17/30038 386/234 |
| 2006/0159109 A1 * | 7/2006 | Lamkin | ............. | G06F 17/30174 370/401 |
| 2007/0180497 A1 * | 8/2007 | Popescu | .............. | H04L 63/0435 726/4 |
| 2007/0198413 A1 * | 8/2007 | Nagao | ................. | H04L 63/0428 705/50 |
| 2007/0288967 A1 * | 12/2007 | Candelore | .............. | H04N 5/913 725/50 |
| 2008/0205640 A1 * | 8/2008 | Shen-Orr | ............... | G06Q 20/10 380/35 |
| 2008/0244681 A1 * | 10/2008 | Gossweiler | .......... | H04N 21/235 725/133 |
| 2010/0331048 A1 * | 12/2010 | Xiang | ....................... | H04S 5/00 455/557 |
| 2012/0096121 A1 * | 4/2012 | Hao | .................... | H04L 67/2842 709/219 |
| 2012/0198084 A1 * | 8/2012 | Keskitalo | ................ | H04L 67/02 709/228 |
| 2013/0129095 A1 * | 5/2013 | Fahrny | .................. | H04L 63/068 380/279 |
| 2013/0347117 A1 * | 12/2013 | Parks | ..................... | H04L 63/08 726/26 |

* cited by examiner

*Primary Examiner* — Benjamin Lanier
(74) *Attorney, Agent, or Firm* — The Concept Law Group, P.A.; Scott D. Smiley; Yongae Jun

(57) ABSTRACT

A method and system is disclosed that provides at least one server device; and at least one remote audio playback device, the remote audio playback device including a unique identifier stored thereon. An encryption key is created by the at least one server device. The at least one server device transmits, over a long range communication network, to the remote audio playback device, music content encrypted using the encryption key and the remote audio playback device's unique identifier.

17 Claims, 7 Drawing Sheets

100

METHOD AND SYSTEM FOR DEVICE DEPENDENT ENCRYPTION AND/OR DECRYPTION OF MUSIC CONTENT

FIELD OF THE INVENTION

The present invention relates generally to encryption and decryption methods, and more particularly relates to a system and method of encryption/decryption for device dependent listening of audio content.

BACKGROUND OF THE INVENTION

It is well-known that music piracy is a prevalent problem for the music industry. In fact, profits for music distributors and artists have greatly decreased due to this piracy problem. In particular, the popularity of the Internet as an information exchange network for the general purchasing public is one of the primary causes. Digital music files, such as mp3 files, can be shared relatively easily and quickly amongst users over the Internet, without having to purchase a license from the music owners. This is also a problem for other types of media files that can be distributed over the Internet, such as digital video/movie files and digital books, etc. Consumers can easily make digital copies of the file and send them to other users that have not purchased a license over the Internet.

One existing solution is to encrypt the digital file using an encryption key. Therefore, even if a copy of the file is made and distributed to unauthorized users illegally, without the encryption key the copy would be useless. Unfortunately, users have developed a work-around for this solution in the form of sharing the encryption key with unauthorized users and even posting the encryption key on servers so that unauthorized users can receive a copy of the file as well as a copy of the encryption key required to decrypt the file. This allows a single digital file to be duplicated freely and played on virtually any device without purchasing a license from the owner of the multimedia content. Accordingly, there is desired a method and/or a system for restricting use of the multimedia content to only authorized users and authorized devices. In addition, there is desired a method and/or a system to additionally monetize or leverage multimedia content to recoup profits lost to distributors and artists through unauthorized use and distribution of the content, while also benefiting consumers.

Therefore, a need exists to overcome the problems with the prior art as discussed above.

SUMMARY OF THE INVENTION

The invention provides a method and system for device dependent encryption and/or decryption of music content that overcomes the hereinafore-mentioned disadvantages of the heretofore-known devices and methods of this general type and that uses a unique identifier hard-wired into a listening device to ensure secure transmission of music content over a network to the listening device.

With the foregoing and other objects in view, there is provided, in accordance with the invention, a method for secure transmission of music content over a network. The method includes providing at least one server device; and at least one remote audio playback device, the remote audio playback device including a unique identifier stored thereon. An encryption key is created; and music content is encrypted using the encryption key and the remote audio playback device's unique identifier. The encrypted music content is transmitted, over a long range communication network, to the remote audio playback device.

In accordance with another feature, an embodiment of the present invention includes receiving at the one server device a request to share the music content encrypted using the encryption key and the unique identifier; and an identification of a target remote audio playback device to receive the shared music content. A sharing encryption key is created; and the music content is encrypted using the sharing encryption key and at least one of the remote audio playback device's unique identifier; and a unique identifier stored upon the target remote audio playback device. The encrypted music content is transmitted, over the long range communication network, to the target remote audio playback device.

In accordance with another embodiment, the long range communication network is at least one of the Internet and a cellular network.

In accordance with yet another embodiment, the unique identifier is a serial number of the remote audio playback device and/or a component within the remote audio playback device.

In accordance with a further embodiment, the unique identifier is a code generated by a processor running on the remote audio playback device.

In accordance with another feature, an embodiment of the present invention includes streaming the encrypted music content over the long range communication network to the remote audio playback device.

In accordance with yet another embodiment, the music content is further encrypted using AES 256-bit encryption.

In accordance with an additional embodiment, the music content is further triple encrypted.

In accordance with a further embodiment, the server device includes at least one database communicatively coupled thereto. The database stores a plurality of unique identifiers, each of the plurality of unique identifiers corresponding to an audio playback device and hardwired into said audio playback device. The server device associates each audio playback device corresponding to a unique identifier stored on the database with a user account associated with the server device.

In accordance with the present invention, a method for secure transmission of music content over a network is disclosed. The method provides a server system having at least one server and at least one database. The server system receives, over a long range communication network, from a requesting audio playback device, a user request to transmit music content stored on the database to a target audio playback device. As a result of receiving the user request, the server system determines an encryption key and encrypts the requested music content using the encryption key and a unique identifier hard-wired into the target audio playback device such that only the target audio playback device can decrypt the encrypted music content. After performing the encrypting step, the server system transmits, over the long range communication network, to the target audio playback device, the encrypted music content.

In accordance with another embodiment of the present invention, the requesting audio playback device is the same as the target audio playback device.

In accordance with an alternative embodiment of the present invention, the requesting audio playback device is different from the target audio playback device.

In accordance with yet another embodiment of the present invention, the long range communication network is the Internet.

In accordance with yet another embodiment of the present invention, the long range communication network is a cellular network.

In accordance with the present invention, a system is provided for secure transmission of music content over a network. The system includes at least one audio playback device having a unique identifier stored thereon; and a server system having at least one server. The server determines an encryption key; and transmits, over a long range communication network, to the audio playback device, music content encrypted using the encryption key and the unique identifier.

Although the invention is illustrated and described herein as embodied in a method and system for device dependent encryption and/or decryption of music content, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
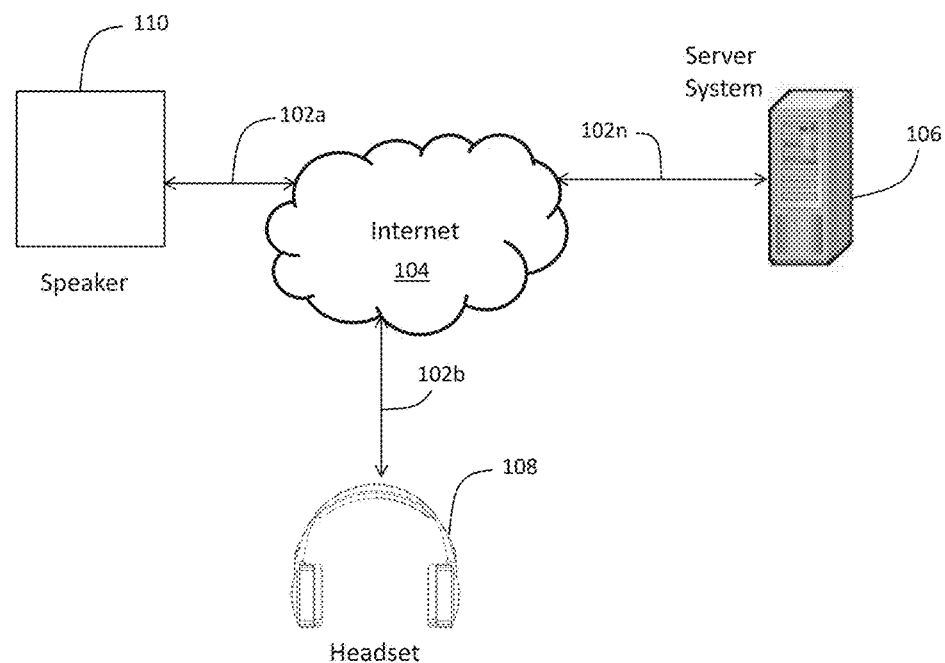
FIG. 1 is a block diagram of an exemplary network in accordance with an exemplary embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient method and system of providing for secure distribution, transmission, and use of digital multimedia content over the Internet. Embodiments of the invention provide a server system along with specialized, dedicated audio playback devices for users that work together to securely transmit music content over wide area networks (WAN), such as the Internet. Embodiments of the invention also restrict the ability to listen to the music content to only authorized users and authorized devices. In particular, audio playback devices include dedicated hardware that have a unique identifier hardwired into the firmware, which is used to decrypt the music content so that only authorized hardware may listen to the music content. In addition, embodiments of the invention provide for the server system to generate a second encryption key that is also used to encrypt the music content for an additional layer of security. Accordingly, listening to the music content requires both the encryption key from the server system and the hard-wired identifier on the dedicated audio hardware (e.g., headset, speaker, etc.). Embodiments of the invention also provide for additionally encrypting the hard-wired identifier on the hardware so that extracting the hard-wired identifier requires knowledge of the decryption algorithm. In further embodiments, the server system manages use of the specialized audio playback devices such that it can determine if an unauthorized audio playback device is attempting to listen to the music content. In yet further embodiments, the music content may be triple encrypted to further increase the difficulty of hacking the transmissions between the server system and the specialized audio playback devices. By having encryption keys or features on both the server side and the audio playback device side, distribution and use of the music content is greatly restricted to only authorized users and authorized playback devices.

Referring now to FIG. 1, one embodiment of the present invention is shown in a network block diagram. FIG. 1 shows several advantageous features of the present invention, but, as will be described below, the invention can be provided in several shapes, sizes, combinations of features and components, and varying numbers and functions of the components. The first example of a network 100 in accordance with the present invention, as shown in FIG. 1, includes connections 102a-n, which are the medium used to provide communications links between various devices and computers connected together within the network 100. The connections 102a-n may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In one embodiment, the network 100 can include the Internet 104, which represents a worldwide collection of networks and gateways that use the TCP/IP suite of protocols to communicate with one another. At the heart of the Internet 104 is a backbone of high-speed data communication lines between major nodes or host computers, consisting of thousands of commercial, government, educational and other computer systems that route data and messages. Of course, the network 100 also may be implemented as a number of different types of networks, such as for example, an Intranet, a local area network (LAN), or a cellular network. FIG. 1 is intended as an example, and not as an architectural limitation for the present invention.

In the depicted example, the network 100 includes a server system 106, a headset 108, and a speaker 110, communicatively coupled over the network 100. The network 100 may include additional servers, databases, and other audio and/or computing devices and entities not shown.

The server system 106 manages distribution of digital content over the network 100 and various user and device permissions, as will be described in more detail below. The present invention will primarily be described in reference to music content; however, it should be understood that embodiments of the present invention may also be used to protect other types of digital content, such as, movies, pictures, documents, books, data, software, and the like.

In one embodiment, the server system 106 includes only one server. In yet another embodiment, the server system 106 includes more than one server, such as, for example, with a cloud computing service. In another embodiment, the server system 106 may include one or more databases that store information used to manage the music content.

The headset 108 can be considered an audio playback device operable to receive encrypted audio communications over the Internet 104 from the server system 106 and decrypt said audio communications in accordance with embodiments of the present invention. The headset 108 may also be referred to as "headphones." The headset 108 may be formed as in-the-ear headphones (e.g., ear buds), on-the-ear headphones, around-the-ear headphones, or any other type of headphone, and may or may not include a microphone. In one embodiment, the headset 108 may be a wired headset. In an alternative embodiment, the headset 108 may be a wireless headset. Preferably, the headset 108 is a specialized headset for use with the server system 106. More particularly, the headset 108 may include a hard-wired unique identifier that is used to decrypt audio communications from the server system 106. Stated another way, audio content transmitted from the server system 106 can be considered device dependent communications that can only be decrypted by a unique device (e.g., the headset 108) that includes the hard-wired unique identifier used to unlock the communications. Each headset 108 associated with the server system 106 may include a unique identifier that is different from any other unique identifier associated with another headset 108. In one embodiment, the unique identifier is hard-wired into circuitry within the headset 108 (e.g., firmware). In another embodiment, the unique identifier is a code generated by a processor running on the headset 108. In yet another embodiment, the unique identifier is a serial number of the headset 108 or a component within the headset 108. In a further embodiment, the unique identifier is an alphanumeric code or another unique combination of symbols hardwired into the headset 108.

The speaker 110 may be an audio playback device operable to receive encrypted audio communications over the Internet 104 from the server system 106 and decrypt said audio communications in accordance with embodiments of the present invention. The speaker 110 may be any type of speaker or speaker component, including wired or wireless speakers, computer speakers, portable speakers, floor standing speakers, a speaker and subwoofer speaker system, stereo speakers, a surround sound speaker system, and the like. Preferably, the speaker 110 is a specialized speaker for use with the server system 106. More particularly, the speaker 110 may include a hard-wired unique identifier that is used to decrypt audio communications from the server system 106. Stated another way, audio content transmitted from the server system 106 can be considered device dependent communications that can only be decrypted by a unique device (e.g., the speaker 110) that includes the hard-wired unique identifier used to unlock the communications. Each speaker 110 associated with the server system 106 may include a unique identifier that is hard-wired into circuitry within the speaker 110 (e.g., firmware). In another embodiment, the unique identifier is a code generated by a processor running on the speaker 110. In yet another embodiment, the unique identifier is a serial number of the speaker 110 or a component within the speaker 110. In a further embodiment, the unique identifier is an alphanumeric code or another unique combination of symbols hardwired into the speaker 110.

Figure 2:
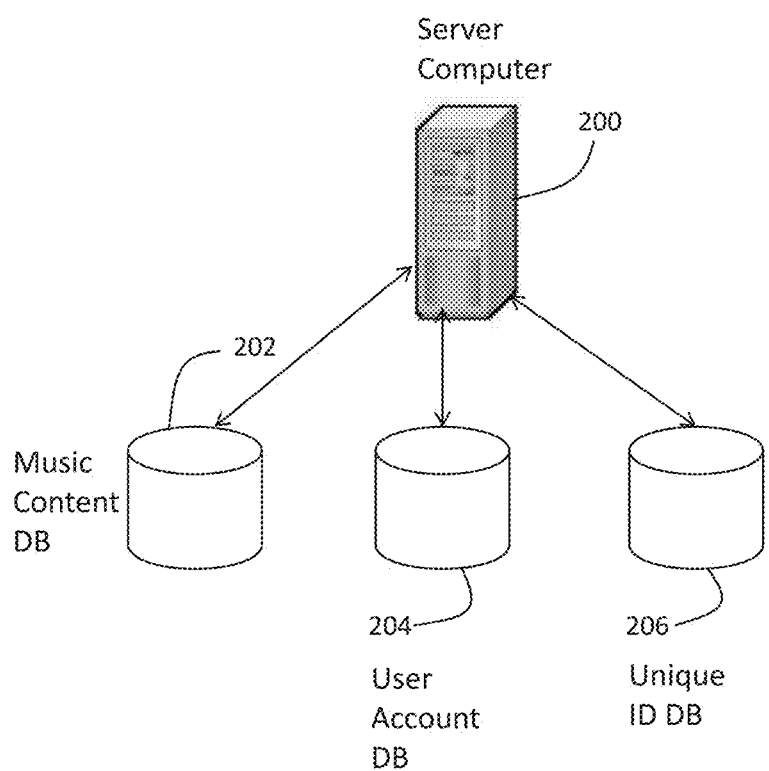
FIG. 2 is a block diagram of an exemplary server system in accordance with an exemplary embodiment of the present invention.

Referring now primarily to FIG. 2 with reference to FIG. 1, another exemplary embodiment of the server system 106 is depicted in a block diagram. In the depicted example, the server system 106 includes a server computer 200, a first database 202, a second database 204, and a third database 206, communicatively coupled to one another. In one embodiment, the server computer 200 can receive, process, and respond to client requests for information and/or data. For example, the server computer 200 can receive requests from client audio playback devices over the network 100 to stream a song stored on one of the databases 202, 204, and 206. As a result, the server computer 200 may process the request by authenticating the audio playback device and the requesting user as having permissions to listen to the song. Upon authentication, the server computer 200 may retrieve the song from the database 202, 204, or 206 and transmit the song, over the network 100 to the requesting audio playback device, or another target audio playback device on the network 100. As will be described in more detail below, the song is inventively encrypted prior to transmission over the network 100 such that only the destination or target audio playback device can decrypt the song in order to listen to it.

The databases 202, 204, and 206 are communicatively coupled to the server computer 200 and store information and/or data used by the server computer 200 to manage the music content and process client requests. The databases 202, 204, and 206 may be considered a storage medium or device. In one embodiment, the databases 202, 204, 206 may be implemented as non-volatile storage on a computer. In another embodiment, the databases 202, 204, 206 may be implemented as one or more hard drives or other storage devices. In one embodiment, the databases 202, 204, 206 may be a cloud-based storage system. In another embodiment, the databases 202, 204, 206 may be implemented as a single database. In yet another embodiment, there may be more than three or less than three databases 202, 204, and 206 communicatively coupled to the server computer 200.

Each of the databases 202, 204, and 206 may store a different set of information that is used to process client requests. For example, in one embodiment, the database 202 may store music content. In a further embodiment, the database 202 may also include user permissions associated with each stored music file. In yet a further embodiment, each user account may be associated with licenses for a limited number of songs. When a user requests to listen to a song stored at the server system 106, the server computer 200 may access the database 202 to determine if the song exists on the database 202, and whether the requesting user or user device has a license associated with the song. If the user has permissions, the server system 106 may transmit the song over the network 100. On the other hand, if the user does not have a license to listen to the song, the server system 106 may deny the user's request. The term "user" is used herein broadly. More particularly, the term "user" may refer to a person, entity, or device that may or may not be associated with a user account. In addition, the term "user" may refer to an authorized user of the server system 106 or an unauthorized person, entity, or device attempting to illegally obtain digital content.

In one embodiment, the database 204 may store user account information, such as logins, passwords, registration information, and the like. In a further embodiment, the database 204 may also include identifier information identifying each specialized hardware device associated with the user account. For example, a user may have a speaker and a headset that each includes specialized chipsets with unique hard-wired identifiers that are known only by the hardware itself and the server system 106 for secure communications. The present invention includes a method of encrypting transmissions between these specialized hardware devices and the server system 106, such that the data being transmitted (e.g., music content) is securely transmitted over the Internet 104 and may only be unlocked by authorized devices and users.

In some embodiments, the server system 106 may also host a social networking environment that allows users to add "friends" to their account. Users may, in some embodiments, share music content with these social network friends. In additional embodiments, this sharing of music content may only be permitted by the server system 106 for users with the specialized hardware devices. For example, the server system 106 may only transmit music content over the Internet 104 to audio playback devices with known unique identifiers that are stored in the database 204 and associated with a valid user account.

In another embodiment, the database 206 may store unique identifiers or identifiers that have been hard-wired into audio playback devices by a manufacturer (and may or may not have been sold to a user or registered by the user with the server system 106). In one embodiment, a part of the digital rights management system of the present invention includes providing manufacturers with a plurality of unique identifiers. Each unique identifier may be hard-wired by the manufacturer into an audio playback device, such as a headset or a speaker. In one embodiment, each unique identifier is hard-wired into a component, such as, for example, a chipset to be included in the audio playback device by a chipset manufacturer. Once an audio playback device becomes registered with a user account, the unique identifier may be associated by the server system 106 with the user account in the user account database 204. In another embodiment, each unique identifier is hard-wired into firmware, read only memory, or another type of dedicated circuitry included in the audio playback device. In one embodiment, each unique identifier is also provided to the server system 106 for storage into the database 206 so that digital content can be encrypted by the server system 106 using the unique identifier. Accordingly, the encrypted content can only be decrypted by a single unique device having a matching unique identifier. As used herein, the term "unique identifier" is intended to indicate any identifier, combination of numbers, letters, characters, bits, bytes, or other symbols that are unique among all identifiers that are hard-wired into devices of the present invention for the purpose of encrypting and/or decrypting digital content to be transmitted over a network, such as the Internet 104.

Figure 3:
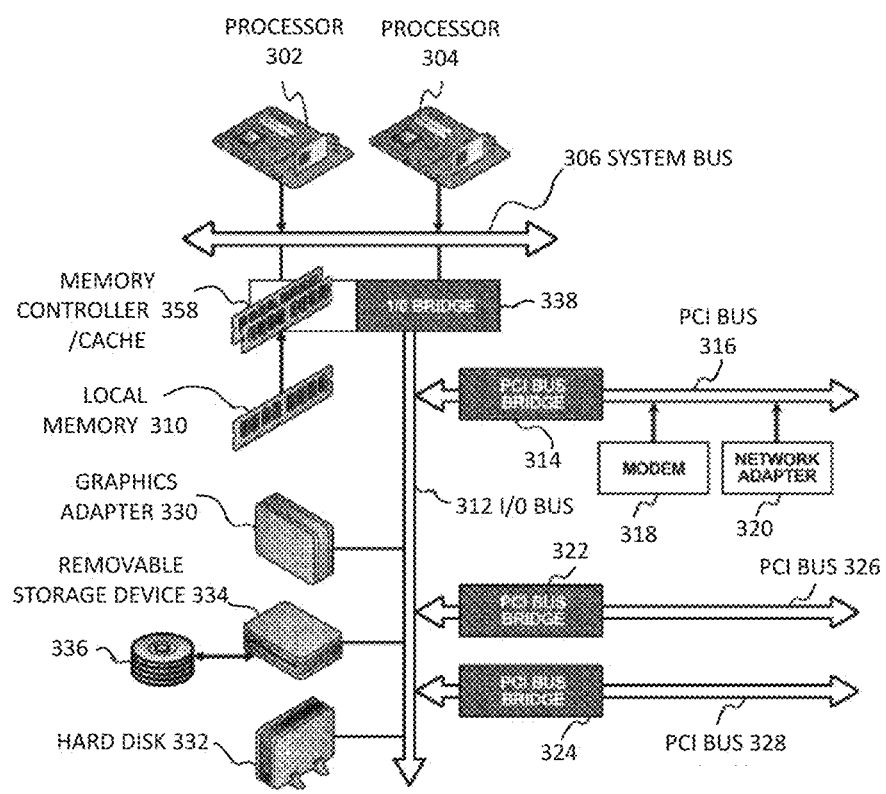
FIG. 3 is a block diagram of a data processing system in accordance with an embodiment of the present invention.

Referring to FIG. 3, a block diagram of a data processing system 300 that may be implemented as a server, such as the server computer 200 (see FIG. 2), or implemented as a personal computer, mobile electronic device, recording device, or other computing device coupled to the network 100, is shown in FIG. 1, in accordance with one embodiment of the present invention. The data processing system 300 may be a symmetric multiprocessor (SMP) system including a plurality of processors 302 and 304 connected to system bus 306. Alternatively, a single processor system may be employed. Also, connected to system bus 306 is memory controller/cache 308, which provides an interface to local memory 310. An I/O bus bridge 338 is connected to system bus 306 and provides an interface to I/O bus 312. The memory controller/cache 308 and I/O bus bridge 338 may be integrated as depicted. The processor 302 or 304 in conjunction with memory controller 308 controls what data is stored in memory 310. The processor 302 and/or 304 and memory controller 308 can serve as a data counter for counting the rate of data flow to the memory 310 or from the memory 310 and can also count the total volume of data accessed to or from the memory 310. The processor 302 or 304 can also work in conjunction with any other memory device or storage location.

Peripheral component interconnect (PCI) bus bridge 314 connected to I/O bus 312 provides an interface to PCI local bus 316. A number of modems 318, or wireless cards, may be connected to PCI bus 316. Typical PCI bus implementations will support four PCI expansion slots or add-in connectors. PCI includes, but is not necessarily limited to, PCI-X and PCI Express components. Communications links to the network of computers in FIG. 1 may be provided through the modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, the data processing system 300 allows connections to a multiple network of computers. A graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The processes explained in detail herein can be embodied in a computer program. Computer programs (also called computer control logic) are stored in memory such as main memory 310, removable storage drive 334, removable media 336, hard disk 332, and signals. Such computer programs, when executed, enable the computer system to perform the features of the present invention as discussed herein. In particular, the computer programs, when executed, cause the processor 302 and/or 304 to perform certain features of the present invention.

In this document, the terms "computer program medium," "computer usable medium," and "computer readable medium" are used to generally refer to media such as main memory 310, removable storage drive 334, removable media 336, hard disk 332, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, which allows a computer to read such computer readable information.

Figure 4:
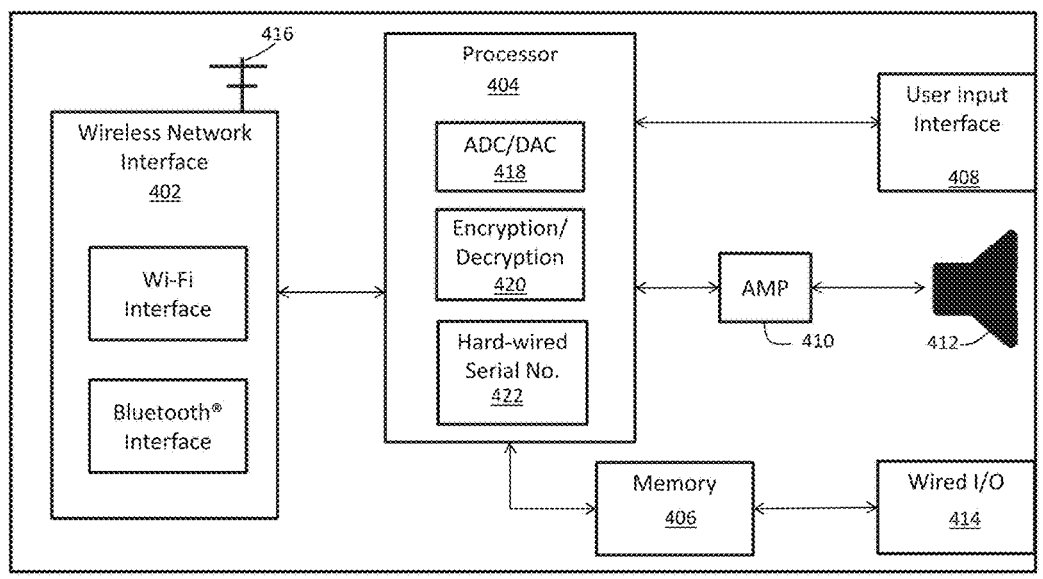
FIG. 4 is a block diagram of an audio playback device in accordance with an embodiment of the present invention.

Referring to FIG. 4, with reference to FIG. 1, a block diagram is shown of a specialized hardware device that may be implemented as an audio playback device 400, such as the headset 108 and/or the speaker 110, in accordance with one embodiment of the present invention. In the depicted example, the audio playback device 400 includes a wireless network interface 402, a processor 404, a memory 406, a user input interface 408, an amplifier 410, a speaker 412, and a digital data port 414.

In one embodiment, the wireless network interface 402 may include one or more network interface cards (NIC) or a network controller. The wireless network interface 402 can include hardware and/or a computer program that is responsible for wireless communications. The wireless network interface 402 may include an antenna 416. In one embodiment, the antenna 416 is a radio frequency transmitter and/or receiver for transmitting and receiving radio frequency signals. In another embodiment, the antenna 416 is a radio frequency transceiver. In one embodiment, the audio communications received via the antenna 416 are converted into analog audio signals by a DAC and subsequently output as sound waves through the speaker 412. Although the wireless network interface 402 is discussed as providing for wireless communications, in some embodiments, the wireless network interface 402 may also include hardware and/or software components configured to provide wired communications.

In some embodiments, the wireless network interface 402 may include a personal area network (PAN) interface. The PAN interface may provide the capability for the audio playback device 400 to network using a short-range communication protocol, for example, a Bluetooth communication protocol. Bluetooth is an industrial specification for wireless PANs. Bluetooth provides a way to connect and exchange information between devices such as smartphones, laptops, PCs, printers, digital cameras, and video game consoles via an unlicensed, short range radio frequency. Bluetooth typically operates at a frequency of about 2.4 GHz. In order to use Bluetooth wireless technology, a device must be able to interpret certain predefined Bluetooth profiles. The profiles define the possible applications that work with the device. Bluetooth profiles define general behaviors through which Bluetooth-enabled devices communicate with other devices. Bluetooth technology defines a wide range of profiles that describe many different types of use cases. At a minimum, each profile specification contains information on the following topics: dependencies on other profiles; suggested user interface formats; and specific parts of the Bluetooth protocol stack used by the profile. To perform its task, each profile uses particular options and parameters at each layer of the stack. The configuration information regarding a profile is in the upper layers of a Bluetooth stack, typically an application layer. The proper profile for a device must be used to establish communication with the device. Beyond those profiles typically needed for general operation, well over twenty device class profiles currently exist. For example, Advanced Audio Distribution Profile (A2DP) is designed to transfer a 2-channel stereo audio stream, like music from an MP3 player, to a headset or car radio. The Headset Profile (HSP) is the most commonly used profile, providing support for Bluetooth headsets to be used with smartphones. It provides for audio communications and relies on a subset of commands to provide minimal controls, including the ability to ring, answer a call, hang up and adjust volume. Other profiles exist for operations, such as, for example printing, transferring files, and video streaming.

In one embodiment, the PAN interface may permit the audio playback device 400 to connect wirelessly to another electronic device (e.g., personal computer) via a peer-to-peer, ad hoc connection, to, for example, register the audio playback device 400 with a user account on the server system 106. For example, in one embodiment, the wireless network interface 402 may include a Wi-fi interface that is configured to support short range, peer-to-peer ad hoc communications. Ad hoc networks allow devices to communicate directly with each other in a peer-to-peer configuration, without requiring an access point, such as a Wi-fi router.

The wireless network interface 402 may also include a local area network (LAN) interface. The LAN interface may be, for example, an interface to a wireless LAN, such as a Wi-fi network. In one embodiment, there is a wireless LAN located at or near the audio playback device 400 that provides the audio playback device 400 with access to the Internet 104 for communicating with the server system 106 to request music in accordance with the present invention. The range of the LAN interface may generally exceed the range available via the PAN interface. Typically, a connection between two electronic devices via the LAN interface may involve communication through a network router or other intermediary device. More particularly, the wireless network interface 402 may include the capability to connect to a wide area network (WAN), such as the Internet 104, via an access point, such as a Wi-fi network router associated with a wireless LAN.

The wireless network interface 402 preferably includes a Wi-fi interface, or IEEE 802.11. In one embodiment, the wireless network interface 402 includes a Wi-fi modem for wirelessly connecting to a Wi-fi access point (AP) that may be considered a router, a gateway, or a hotspot. Currently, APs have a range of about 20 meters indoors and an even longer range outdoors. Wi-fi networks are generally considered less secure than its wired counterpart, Ethernet communications, or Bluetooth networks. On the other hand, Wi-fi networks are able to connect to more devices than Bluetooth networks and offer a much longer range of wireless communications than Bluetooth.

In one embodiment, the audio playback device 400 may also include a near field communication (NFC) interface. The NFC interface may allow for extremely close range communication at relatively low data rates (e.g., 424 kb/s). The NFC interface may take place via magnetic field induction, allowing the NFC interface to communicate with other NFC interfaces located on other electronic mobile devices. The NFC interface may enable initiation and/or facilitation of data transfer from the audio playback device 400 to another electronic device with an extremely close range (e.g. 4 centimeters).

The processor 404 can be, for example, a central processing unit (CPU), a microcontroller, or a microprocessing device, including a "general purpose" microprocessing device or a special purpose microprocessing device. In one embodiment, the processor 404 can be formed as a system on chip (SoC). As is known in the art, an SoC is an integrated circuit (IC) that includes all components of a computer on a single chip. Many mobile devices will use an SoC, rather than separating the processor and chipset, because of the SoC's relatively low power consumption. In some embodiments, the processor 404 can be considered a special purpose processor because the unique identifier may be hard-wired into the SoC or microcontroller and used to encrypt and decrypt device dependent communications between the server system 106. In one embodiment, the processor 404 executes code stored in the memory 406 in order to carry out operation/instructions of the audio playback device 400. The processor 404 may provide the processing capability to execute an operating system, run one or more applications, and provide processing for one or more of the techniques described herein.

In one embodiment, the processor 404 may include and/or be communicatively coupled to an ADC/DAC 418. Although the ADC/DAC 418 is depicted as part of the processor 404 in FIG. 4, it is understood that, in other embodiments, the ADC/DAC 418 may be separate from and communicatively coupled to the processor 404. In one embodiment, the ADC/DAC 418 may be implemented as a single unit in some embodiments, or as separate ADC and DAC components in other embodiments. In one embodiment, the ADC is operable to convert analog data into digital data at a rate of approximately 192 kHz, which is approximately five times the resolution of a typical music CD. Advantageously, providing an ADC that is able to convert analog into digital at a relatively high rate, as compared with other methods, provides a higher quality musical sound. In another embodiment, the ADC may be operable to convert analog data into digital data at rates higher than or less than 192 kHz. In yet another embodiment, the ADC may be operable to convert analog data into digital data up to and also exceeding 320 kHz.

In one embodiment, the audio playback device 400 includes a unique identifier that is hard-wired into the device 400. In another embodiment, the unique identifier can be implemented as a hard-wired serial number 422. In yet another embodiment, the serial number can be represented as an alphanumeric code that is unique to the particular audio playback device 400. In yet another embodiment, the unique identifier can be represented as another combination of symbols or characters that are unique to the particular audio playback device 400. Accordingly, no two audio playback devices 400 have the same hard-wired identifier so that encrypted communications from the server system 106 can be considered device dependent. In other words, encrypted communications from the server system 106 to client audio playback devices 400 can only be decrypted by the audio playback device 400 that includes the correct unique hard-wired serial number necessary to unlock the encryption. As used herein, the term "hard-wired" is intended to indicate that the unique identifier is implemented in the form of permanent electronic circuitry. For example, in one embodiment, the unique identifier is implemented in a specialized chipset by the manufacturer of the chipset. In another embodiment, the unique identifier may be provided as firmware, read-only memory, or another form of permanent electronic circuitry. In yet another embodiment, the hard-wired serial number 422 is also encrypted. Accordingly, any hackers that may attempt to decipher the serial number directly from the hardware would not be able to decipher the serial number without the encryption key to unlock the hard-wired serial number 422.

The audio playback device 400 includes an encryption/decryption engine 420. The encryption/decryption engine uses the hard-wired serial number 422 to encrypt and decrypt communications to and from the server system 106. In one embodiment, the encryption/decryption engine 420 is implemented as logic circuitry on a chipset. In a further embodiment, the encryption/decryption engine 420 and the hard-wired serial number 422 are provided on the same chipset so as to increase the speed of encrypting and decrypting network communications as compared to other embodiments.

In one embodiment, the encryption/decryption engine 420 is configured to decrypt communications from the server system 106 by using the hard-wired serial number 422 to unlock an encrypted encryption key generated by the server system 106. Next, the encryption/decryption engine 420 may use the unlocked encryption key to decrypt the data packet. The data packet may contain the music content or other proprietary digital content desired to be used by the audio playback device 400. In another embodiment, the encryption/decryption engine 420 may use a key-pairing algorithm to decrypt communications from the server system 106, or other encryption algorithms.

In another embodiment, the encryption/decryption engine 420 may use the hard-wired serial number 422 to encrypt meta data that is sent to the server system 106. In a further embodiment, the meta data may include information such as the song's artist, name, and title, current time and date information, etc. In yet a further embodiment, the meta data may include audio playback device 400 information, such as location data identifying, for example, a GPS position of the device 400, the speed of the processor 404, the type of audio playback device 400, and the like. In yet a further embodiment, the meta data may be collected by the server system 106 and stored in one or more of the databases 202, 204, and 206 (see FIG. 2). Such information may be useful for music distributors, artists, and owners to learn about use of the music content in order to better serve consumers.

In another embodiment, the encryption/decryption engine 420 may be configured to implement advanced encryption standard (AES) encryption/decryption. In one embodiment, the encryption/decryption engine 420 may use AES 256-bit encryption and decryption. In other embodiments, the encryption/decryption engine 420 may use AES 128-bit or 192-bit encryption and decryption. In yet another embodiment, the communications from the server system 106 may be triple encrypted. Accordingly, the encryption/decryption engine 420 may be configured to implement tripe encryption and/or decryption of communications from the server system 106. In one embodiment, the triple encryption/decryption may include use of three encryption keys $K_1$, $K_2$, and $K_3$ in order to encrypt data. Triple encryption adds an additional layer of security to protect against hacking attempts.

The encryption/decryption engine 420 may be included in the processor 404, or may be communicatively coupled to and separate from the processor 404. In one embodiment, the encryption/decryption engine 420 may include a computer instruction set configured to apply one or more encryption and/or decryption techniques described herein to the audio communications. In one embodiment, the encrypted communications from the server system 106 remain encrypted until just prior to being converted from digital data into analog audio signals by the DAC 418. Accordingly, pirating the music content becomes very difficult. For example, pirating the music content may require using a logic probe to intercept the electrical signals in a manner that would destroy the circuitry. As another example, pirating the music content may include intercepting the analog data, which may not be a perfect digital copy. In other words, making of a copy of the data associated with the digital content would be very cumbersome, outside of the technical scope of a typical consumer, and may result in a low quality reproduction. In one embodiment, each of the ADC/DAC 418, the encryption/decryption engine 420, and the hard-wired serial number 422 are included in the same chipset. In another embodiment, one or more of the ADC/DAC 418, the encryption/decryption engine 420, and the hard-wired serial number 422 may be disposed on a separate but communicatively coupled chipset.

The memory 406 associated with the audio playback device 400 may be, for example, one or more buffers, registers, a flash memory, or non-volatile memory, such as random access memory (RAM). The audio playback device 400 may also include non-volatile storage. The non-volatile storage may represent any suitable storage medium, such as a hard disk drive or non-volatile memory, such as flash memory or an EEPROM.

The user input interface 408 may allow the user to provide inputs to the audio playback device 400. The user input interface 408 may include a keypad providing a variety of user input operations. For example, the keypad may include alphanumeric keys for allowing entry of alphanumeric information (e.g. telephone numbers, contact information, text, etc.). The user input interface 408 may include special function keys (e.g. a volume control buttons, back buttons, home button, etc.), navigation and select keys, a pointing device, and the like.

The audio playback device 400 preferably provides the user with the ability to listen to the music content that is received from the server system 106 via the wireless network interface 402. Accordingly, in one embodiment, the audio playback device 400 may include the amplifier 410. The amplifier 410 may be communicatively coupled to the speaker 412 for amplifying audio signals that are transmitted to the speaker 412. The speaker 412 uses the audio signals to cause vibrations that produce sounds waves.

The digital data port 414 functions to allow digital data to be communicated through a wired connection, which may be particularly useful for the initial registration of the audio playback device 400 with the server system 106. In one embodiment, the digital data port 414 may be a universal serial bus (USB) port. The USB port may be configured to connect with any one of a plurality of USB connector types, including an A-type connector, a B-type connector, a micro-USB connector, a USB Mini-b connector, a USB 3.0 connector, and the like. In another embodiment, data ports other than a USB port may be utilized to provide a wired connection to another electronic device, such as a PC, a computer tablet, and the like.

Figure 5:
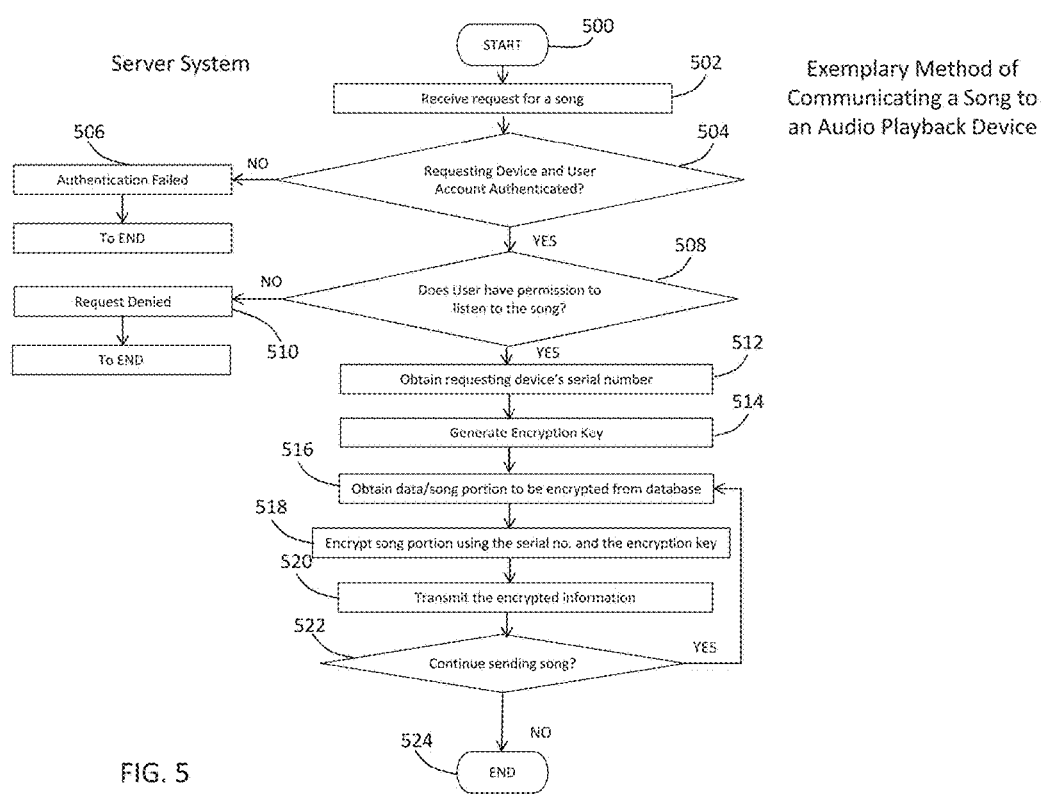
FIG. 5 is a process flow chart representing an exemplary method of communicating a song over a network to an audio playback device in accordance with an embodiment of the present invention.
Figure 6:
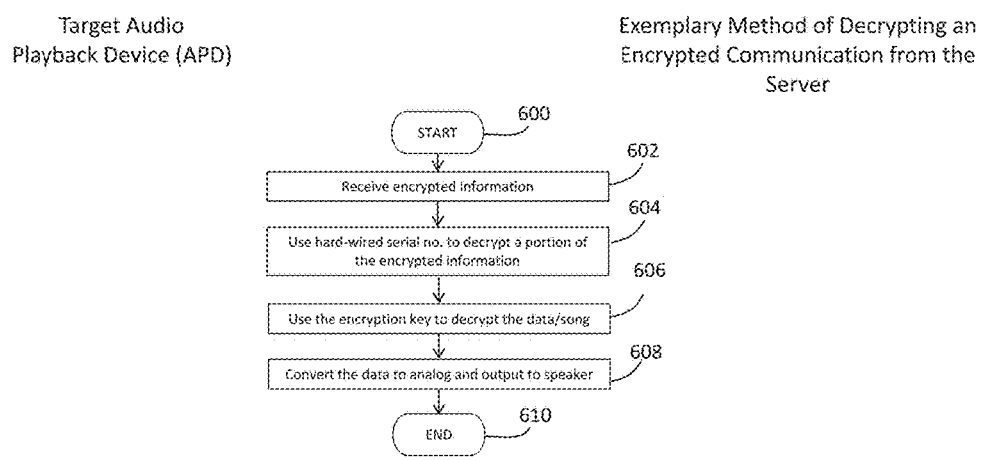
FIG. 6 is a process flow chart representing an exemplary method of decrypting encrypted communications in accordance with an embodiment of the present invention.
Figure 7:
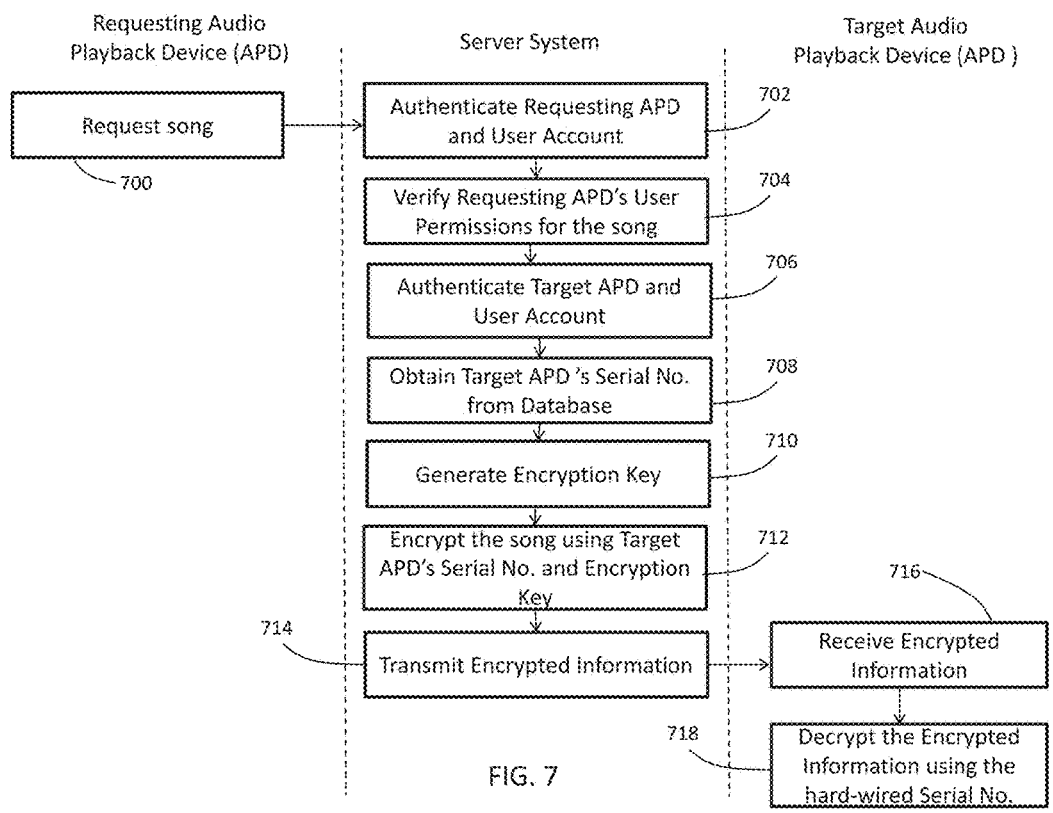
FIG. 7 is a process flow chart representing an exemplary method of sharing a song over the Internet with a friend's audio playback device in accordance with the present invention.

The process flow charts of FIGS. 5 through 7 will be described to illustrate exemplary processes that may be implemented in accordance with the present invention. Although FIGS. 5 through 7 show a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 5 through 7 for the sake of brevity. In some embodiments, some or all of the process steps included in FIGS. 5 through 7 can be combined into a single process.

The process flow chart of FIG. 5 will be described with reference to FIGS. 1, 2, and 4. The process of FIG. 5 begins at step 500 and moves directly to step 502, where the server system 106 receives, over a long range communication network, from a requesting audio playback device 400, a user request to transmit music content stored at the server system 106 to a target audio playback device 400. In one embodiment, the requesting audio playback device 400 is the same as the target audio playback device 400. In other words, the requesting audio playback device 400 is requesting to receive the music content from the server system 106. In an alternative embodiment, the requesting audio playback device 400 is different from the target audio playback device 400. In other words, the requesting audio playback device 400 is requesting that another audio playback device 400 (e.g., a friend's audio playback device) receive the music content. In one embodiment, the long range communication network includes the Internet 104. In another embodiment, the long range communication network includes a cellular network.

In step 504, the server system 106 determines whether the requesting audio playback device 400 is authentic and whether the user account associated with the requesting audio playback device 400 is valid. In one embodiment, the server system 106 authenticates the requesting audio playback device 400 by verifying that the identifier associated with the request matches an identifier stored in a database associated with the server system 106. In another embodiment, the server system 106 may verify that the user account associated with the requesting audio playback device 400 exists in a user account database and has paid any account fees that may be required for the service. In yet another embodiment, the user associated with the requesting audio playback device 400 may be required to input a user account name and/or password to authenticate the user account and audio playback device 400.

If the server system 106 determines that the requesting audio playback device 400 is not authentic and/or the user account associated with the request is not valid, the process proceeds to step 506, where the authentication has failed. From step 506, the process proceeds to step 524, where the process ends. On the other hand, if the server system 106 determines that the requesting audio playback device 400 is authentic and the user account associated with the request is valid, the process proceeds to step 508, where the server system 106 determines whether the user has permission to listen to the requested digital content (e.g., song). In one embodiment, the server system 106 may query the music content database 202 to determine if the user account is associated with permission to listen to the song, such as, for example, a license to the song. If the server system 106 determines that the user account is not associated with a license to the song, the process proceeds to step 510, where the request is denied. This step may also include providing the user with a hyperlink or other opportunity to purchase a license to listen to the song. If the user purchases a license, the user may initiate the request again in step 502. From step 510, the process proceeds to step 524, where the process ends. On the other hand, if the server system 106 determines that the user account is associated with a license to the song (e.g., the user already purchased the song), the process proceeds to step 512, where the server system 106 obtains the unique identifier associated with the target audio playback device 400. In one embodiment, the unique identifier is stored in a database associated with the server system 106. In one embodiment, the unique identifier may be in the form of a unique serial number. In a preferred embodiment, the unique identifier is hard-wired into the audio playback device 400 to facilitate secure device dependent communications between client audio playback devices 400 and the server system 106 over the long range communication network 100.

In step 514, the server system 106 determines an encryption key. In one embodiment, the server system 106 generates an encryption key to be used for securing transmission of the song to the target audio playback device 400. In one embodiment, generation of the encryption key is performed on the fly as the request is being processed by the server system 106. In an alternative embodiment, the encryption key is pre-stored in a database and associated with the user and/or the song. In another embodiment, the server system 106 may use the unique identifier to create the encryption key. In yet another embodiment, the server system 106 may create the encryption key, independent of the unique identifier. For example, the unique identifier may be used to encrypt the encryption key, while the encryption key is used to encrypt the data (e.g., song). In a further embodiment, the encryption key may be associated with the user and the song, such that a request by another user of the same song, or a request by the user of another song, would result in use of a different encryption key. In one embodiment, the encryption key may be randomly generated or pseudo-randomly generated. In another embodiment, the encryption key may be generated by another type of algorithm. In one embodiment, the encryption key may be a 256-bit key. In another embodiment, the encryption key may be greater than or less than 256-bits. The encryption key may be a binary number that can be any number of bits in length. The encryption key can be considered a binary code (or other type of code) that is combined in some manner (usually specified by the encryption algorithm that is used) with the original data or information so as to encrypt (or lock) the data for secure transmissions over a network. Unlocking the encrypted data typically requires knowledge of the key on the receiving end in order to unlock/decrypt the data.

In one embodiment, the encryption key generated by the server system 106 can be considered a single key pair in a paired key encryption scheme. For example, in one embodiment, the audio playback device 400 includes a unique key along with the unique identifier and the server system 106 generates an encryption key that is paired to the unique key hard-wired in the audio playback device 400 or a component therein. Accordingly, if a hacker is able to hack into the server system 106 to obtain the encryption key, the hacker would only possess one half of the paired keys.

In step 516, the server system 106 obtains the data from a database. In one embodiment, the data is a digital copy of the music content. In another embodiment, the data is a portion of the digital music content. In yet another embodiment, the data is at least a portion of a song. In yet another embodiment, the data includes meta data associated with the music content and/or the audio playback device 400. In further embodiments, the data may be other types of digital content, such as books, documents, software, movies, and the like.

In step 518, the server system 106 encrypts the data using the unique serial number and the encryption key. In one embodiment, the server system 106 encrypts the data (e.g., song) using the encryption key and then encrypts the encryption key using the unique serial number. Accordingly, decryption may be accomplished by first decrypting the encryption key with the unique serial number and then using the encryption key to decrypt the data. In another embodiment, the server system 106 encrypts the data with both the unique serial number and the encryption key using another type of encryption algorithm. In yet another embodiment, the server system 106 uses the unique serial number to create the encryption key and then uses the encryption key to encrypt the data. Known encryption schemes include AES, DES, triple DES, SKIPJACK, IDEA, and the like.

In step 520, the server system 106 transmits the encryption package over the network 100 to the target audio playback device 400. In one embodiment, the server system 106 transmits a portion of the song in the encryption package (e.g., streaming the song). In another embodiment, the server system 106 may transmit the complete song.

Users may desire the ability to receive a digital copy of the entire song in order to store the song at the user's device 400. In such an embodiment, the song may be partially encrypted such that the user's unique audio playback device 400 may decrypt and listen to the song; but, if the user sends the digital copy of the song to another user, the copy cannot be decrypted. For example, the downloaded digital copy of the song may be encrypted by the server system 106 using the audio playback device's 400 unique hard-wired identifier 422 and not an encryption key generated by the server system 106. Accordingly, the audio playback device 400 may decrypt and listen to the song without having to be connected to the Internet 104 or the server system 106. But, at the same time, the song is protected from piracy because only the audio playback device 400 may listen to the song. Of course, in this scenario, the server system 106 would only send the partially decrypted digital copy of the song to an audio playback device 400 with permission, such as, a license. In one embodiment, the server system 106 may require the user to purchase a limited license in order to download the partially encrypted song with the ability to listen to the song without being connected to the server system 106.

In step 522, the server system 106 queries whether to continue sending the song. In one embodiment, the server system 106 may determine whether the song is complete. If the song is complete, the process proceeds to step 524, where the process ends. If the song is not complete, the process proceeds to step 516, where the server system 106 obtains the next portion of the song and the process repeats. The process ends at step 524.

Referring to FIG. 6, an exemplary method of decrypting encrypted communications in accordance with the present invention is presented and will be described, with reference to FIGS. 1, 2, and 4. The process of FIG. 6 begins at step 600 and moves directly to step 602, where the audio playback device 400 receives encrypted information from the server system 106. In one embodiment, the encrypted information may be in the form of an encryption package in which data is encrypted using an encryption key generated by the server system 106 and the encryption key is encrypted using a unique serial number associated with the audio playback device 400. More particularly, the unique serial number may be hard-wired into circuitry on the audio playback device 400. In another embodiment, the data may be encrypted with the encryption key and the unique serial number using another type of encryption algorithm.

In step 604, the audio playback device 400 may use the serial number 422 hard-wired into its circuitry to decrypt at least a portion of the encryption information. In one embodiment, the audio playback device 400 may use the serial number 422 to decrypt the encryption key. In step 606, the audio playback device 400 may use the encryption key to decrypt the data portion of the encryption information. The data portion may include at least a portion of a song that was requested by the audio playback device 400. The portion of the song may be provided in the form of digital data. In other embodiments, the data portion may include other types of digital data, such as books, documents, software, movies and the like. Once the data portion is decrypted, the audio playback device may use the digital data. In step 608, the audio playback device 400 may convert the digital data to analog data and output the analog data through the speaker 412 for the user to listen to. Conversion of the digital data to the analog data may be performed by the ADC/DAC 418. The process ends at step 610. The decryption process described in FIG. 6 is merely exemplary and is not intended to be a limitation of the present invention.

Referring to FIG. 7, an exemplary method of a user requesting a song to be played on a friend's audio playback device in accordance with the present invention is illustrated and will be described, with reference to FIGS. 1, 2, and 4. The process of FIG. 7 begins at step 700, where the requesting audio playback device 400 sends a request, over the network 100, to the server system 106, that a song stored at the server system 106 be played on a friend's audio playback device 400. The friend's audio playback device 400 is communicatively coupled to the server system 106 and is preferably registered with the server system 106 and associated with a valid user account. In step 702, the server system 106 authenticates the requesting audio playback device 400 and associated user account, as described with reference to FIG. 5. In step 704, the server system 106 verifies that the requesting audio playback device 400 has permission to listen to the song requested in step 700. In step 706, the server system 106 also authenticates the friend's/target audio playback device 400 and the associated user account to verify that the friend has a compatible audio playback device 400 and a valid user account to be able to communicate with the server system 106. In step 708, the server system 106 obtains the unique serial number of the target audio playback device 400 from the database 204. In step 710, the server system 106 generates an encryption key for the communication, and, in step 712, the server system 106 encrypts the music content using the encryption key and the unique serial number of the target audio playback device 400. In step 714, the server system 106 transmits the encrypted music content, over the network 100, to the target audio playback device 400. In step 716, the target audio playback device 400 received the encrypted music content, and, in step 718, the target audio playback device 400 decrypts the encrypted music content using its unique hard-wired serial number 422. In one embodiment, the music content is transmitted to both the requesting audio playback device 400 and the target audio playback device 400. In other words, the music content may be shared and received simultaneously by both audio playback devices 400. In such an embodiment, the copy of the music content transmitted to the requesting audio playback device 400 may be encrypted using the requesting audio playback device's 400 unique serial number, while the copy of the music content transmitted to the target audio playback device 400 may be encrypted using the target audio playback device's 400 unique serial number.

A novel and efficient method and system has been disclosed that secures the distribution, transmission, and use of digital multimedia content over the Internet. The system and method include a server system and specialized, dedicated audio playback devices for authorized listeners so that digital audio content can be securely transmitted music over the Internet, while also restricting the ability to listen to the audio content to only authorized devices. In particular, the dedicated hardware includes a unique hard-wired identifier that is used to decrypt the music content so that only authorized playback devices may listen to the music content.

What is claimed is:

1. A method for secure transmission of music content over a network, the method comprising steps of:
  providing:
    at least one server device; and
    at least one remote audio playback device, the remote audio playback device including a unique identifier stored thereon, the unique identifier also pre-stored on the at least one server device prior to a user-registration of the at least one remote audio playback device with the at least one server device and the audio playback device being formed as at least one of a headphone and a speaker;
  creating, by the at least one server device, an encryption key independent of the unique identifier stored on the at least one remote audio playback device;
  encrypting, by the at least one server device, a music content using the encryption key;
  encrypting, by the at least one server device, the encryption key using the unique identifier stored on the at least one server device; and
  transmitting, by the at least one server device, over a long range communication network, to the remote audio playback device, the music content encrypted using the encryption key and the encryption key encrypted using the remote audio playback device's unique identifier.

2. The method in accordance with claim 1, further comprising:
receiving at the at least one server device:
a request to share the music content encrypted using the encryption key; and
an identification of a target remote audio playback device to receive the shared music content;
creating a sharing encryption key; and
transmitting, over the long range communication network, to the target remote audio playback device, music content encrypted using the sharing encryption key and at least one of:
the remote audio playback device's unique identifier; and
a unique identifier stored upon the target remote audio playback device.

3. The method in accordance with claim 1, wherein:
the audio playback device has the unique identifier hardwired thereon and the music content is decrypted at the at least one of the headphone and the speaker.

4. The method in accordance with claim 1, wherein:
the unique identifier is a serial number of at least one of the remote audio playback device and a component within the remote audio playback device.

5. The method in accordance with claim 1, wherein:
the transmitting step includes streaming the encrypted music content over the long range communication network to the remote audio playback device.

6. The method in accordance with claim 1, wherein:
the at least one remote audio playback device includes a digital-to-analog converter disposed within the at least one headphone and the speaker and the at least one headphone and the speaker is operably configured to decrypt the encrypted music content prior to a conversion of the music content by the digital-to-analog converter.

7. The method in accordance with claim 1, wherein:
the music content is further triple encrypted.

8. The method in accordance with claim 1, wherein:
the at least one server device further includes at least one database communicatively coupled thereto, the at least one database storing a plurality of unique identifiers, each of the plurality of unique identifiers corresponding to an audio playback device and hardwired into said audio playback device; and
the at least one server device associates each audio playback device corresponding to a unique identifier stored on the at least one database with a user account associated with the at least one server device.

9. A method for secure transmission of music content over a network, the method comprising steps of:
providing a server system having at least one server and at least one database;
the server system receiving, over a long range communication network, from a requesting audio playback device, a user request to transmit music content stored on the at least one database to a target audio playback device formed as at least one of a target headphone and a target speaker;
as a result of receiving the user request, the server system determining an encryption key and encrypting the requested music content using the encryption key and a unique identifier hard-wired into the at least one of the target headphone and the target speaker such that only the at least one of the target headphone and the target speaker can decrypt the encrypted music content, the unique identifier of the at least one of the target headphone and the target speaker being pre-stored on the server system prior to a user-registration of the at least one of the target headphone and the target speaker with the server system; and
after performing the encrypting step, the server system transmitting, over the long range communication network, to the target audio playback device, the encrypted music content.

10. The method in accordance with claim 9, wherein:
the requesting audio playback device is the same as the target audio playback device.

11. The method in accordance with claim 9, wherein:
the requesting audio playback device is different from the target audio playback device.

12. The method in accordance with claim 9, wherein:
the long range communication network is a cellular network.

13. The method in accordance with claim 9, wherein:
the at least one of the target headphone and the target speaker includes a digital-to-analog converter disposed within the at least one of the target headphone and the target speaker and the at least one of the target headphone and the target speaker is operably configured to decrypt the encrypted music content prior to a conversion of the music content by the digital-to-analog converter.

14. The method in accordance with claim 9, wherein:
the requested music content is further triple encrypted.

15. The method in accordance with claim 9, wherein:
the transmitting step includes streaming the encrypted music content over the long range communication network to the target audio playback device.

16. A system for secure transmission of music content over a network, the system comprising:
at least one audio playback device having a unique identifier stored thereon, the at least one audio playback device formed as at least one of a headphone and a speaker having the unique identifier stored thereon and operably configured to decrypt an encrypted music content at the at least one of the headphone and the speaker using the unique identifier stored thereon; and
a server system having at least one server, the at least one server:
determines an encryption key; and
transmits, over a long range communication network, to the at least one audio playback device, the encrypted music content encrypted using the encryption key and the unique identifier, the unique identifier of the at least one of the headphone and the speaker being pre-stored on the at least one server prior to a user-registration of the at least one of the headphone and the speaker with the at least one server.

17. The system in accordance with claim 16, wherein the server system further includes:
at least one database storing a plurality of unique identifiers, each of the plurality of unique identifiers corresponding to an audio playback device and stored thereon.

* * * * *